(12) United States Patent
Moritani et al.

(10) Patent No.: US 7,831,644 B2
(45) Date of Patent: Nov. 9, 2010

(54) ELECTRONIC APPARATUS AND CONTENT DATA PROVIDING METHOD

(75) Inventors: Mitsuaki Moritani, Yokohama (JP);
Yasuhiro Morioka, Kawasaki (JP);
Hiroki Iwahara, Inagi (JP); Naomiki Kobayashi, Ome (JP); Hirokazu Nagashima, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/421,437

(22) Filed: Apr. 9, 2009

(65) Prior Publication Data

US 2009/0292707 A1 Nov. 26, 2009

(30) Foreign Application Priority Data

May 20, 2008 (JP) ............................. 2008-132057

(51) Int. Cl.
*G06F 17/30* (2006.01)
*G06F 15/16* (2006.01)

(52) U.S. Cl. ........................................ 707/828; 709/201
(58) Field of Classification Search ........................ None
See application file for complete search history.

(56) References Cited

U.S. PATENT DOCUMENTS

| | | | |
|---|---|---|---|
| 7,209,995 B2 | 4/2007 | Pinto et al. | |
| 2001/0006902 A1 | 7/2001 | Ito | |
| 2002/0169004 A1 | 11/2002 | Thil et al. | |
| 2004/0205147 A1 | 10/2004 | Fukuzato | |
| 2005/0138179 A1* | 6/2005 | Encarnacion et al. | ....... 709/227 |
| 2005/0138193 A1* | 6/2005 | Encarnacion et al. | ....... 709/230 |
| 2005/0224589 A1 | 10/2005 | Park et al. | |
| 2006/0039221 A1* | 2/2006 | Fukuda | ....... 365/222 |

| | | |
|---|---|---|
| 2006/0106959 A1 | 5/2006 | Plourde |

(Continued)

FOREIGN PATENT DOCUMENTS

JP 2002-91709 3/2002

(Continued)

OTHER PUBLICATIONS

S. Morioka, "Device Control Technique UPnP AV for AV Home Network," *Toshiba Review*, Toshiba Corporation, Jun. 1, 2007, vol. 62, No. 6, pp. 78-79.

(Continued)

*Primary Examiner*—Neveen Abel Jalil
*Assistant Examiner*—Tarek Chbouki
(74) *Attorney, Agent, or Firm*—Finnegan, Henderson, Farabow, Garrett & Dunner, L.L.P.

(57) ABSTRACT

According to one embodiment, an electronic apparatus includes a wireless communication device, an information acquisition module, a file management information generation module, and an access control module. The information acquisition module acquires, by wireless communication with an external device, metadata corresponding to content data which the external device can provide. The file management information generation module generates, based on the acquired metadata, file management information based on which a host apparatus recognizes the content data as a file stored in a storage medium in the electronic apparatus. The access control module is configured to, upon receiving a read request for a file corresponding to the content data, which is transmitted from the host apparatus, execute external device access processing of acquiring the content data from the external device using the wireless communication device, and output the acquired content data to the host apparatus.

7 Claims, 14 Drawing Sheets

U.S. PATENT DOCUMENTS

| | | |
|---|---|---|
| 2007/0085840 A1 | 4/2007 | Asaka et al. |
| 2007/0140424 A1* | 6/2007 | Serceki ................... 378/62 |
| 2007/0239795 A1 | 10/2007 | Oyanagi et al. |
| 2007/0239867 A1* | 10/2007 | Belimpasakis et al. ...... 709/224 |
| 2007/0260881 A1* | 11/2007 | Krasnyanskiy et al. ...... 713/165 |
| 2007/0288517 A1 | 12/2007 | Takatsuka |
| 2007/0291945 A1* | 12/2007 | Chuang et al. ............. 380/270 |
| 2008/0154974 A1 | 6/2008 | Obata et al. |
| 2008/0219672 A1* | 9/2008 | Tam et al. .................. 398/130 |
| 2009/0086688 A1* | 4/2009 | Kvache et al. .............. 370/338 |
| 2009/0228530 A1* | 9/2009 | Anglin et al. ............... 707/204 |
| 2009/0292830 A1 | 11/2009 | Nagashima et al. |
| 2010/0067585 A1* | 3/2010 | Cai et al. .................... 375/256 |

FOREIGN PATENT DOCUMENTS

| | | |
|---|---|---|
| JP | 2002-345039 | 11/2002 |
| JP | 2003-8589 | 1/2003 |
| JP | 2005-080276 | 3/2005 |
| JP | 2006-221394 | 8/2006 |
| JP | 2006-524848 | 11/2006 |
| JP | 2007-018463 | 1/2007 |
| JP | 2007-179215 | 7/2007 |
| JP | 2008-016019 | 1/2008 |
| JP | 2008-028837 | 2/2008 |
| JP | 2008-040858 | 2/2008 |

OTHER PUBLICATIONS

Notice of Grant for Japanese Patent Application No. 2008-132182, filed May 20, 2008 (1 page).

* cited by examiner

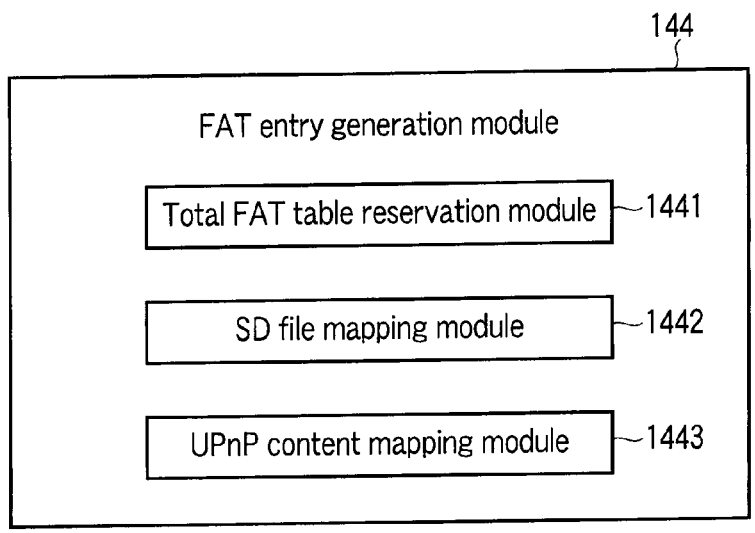
F I G. 7
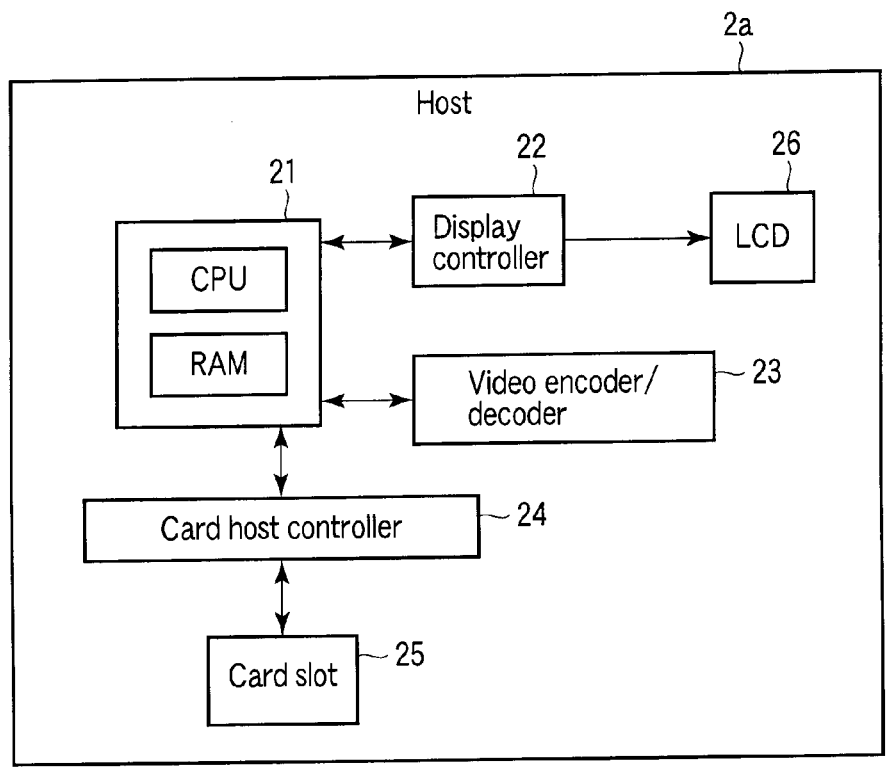
F I G. 8

| Cluster designed by host | Type(SD/UPnP) | Assigned cluster | URL (UPnP) | Offset |
|---|---|---|---|---|
| Smaller than 512 | SD | | | |
| | UPnP | 512-599 | 192.168.2.10:/Data/Video/upnp1 | 0Byte |
| | UPnP | 600-700 | 192.168.2.11:/contents/Video/upnp2 | 1,000Byte |
| ····· | | 701 | | |

F I G. 12

| Name | IP | Class | Capability | MediaFormat | LinkProtection |
|---|---|---|---|---|---|
| Server-A | 192.168.2.10 | Server | -UPL-,-DNL- | MPEG_PS_NTSC,MPEG_TS_J_DTCP | DTCP-IP |
| Server-B | 192.168.2.11 | Server | -DNL- | WMVMED_BASE,WMVHIG_PRO | WMDRM |
| Server-C | 192.168.2.12 | Server | | LPCMS,MP3 | |
| Renderer-D | 192.168.2.13 | Renderer | | MPEG_PS_NTSC,MPEG_TS_DTCP | |
| Controller-E | 192.168.2.14 | Controller | +PUS+,+UPL+,+DNL+ | MPEG4_PS_MP4_SP_AAC,MP3,JPEG | |

F I G. 13

| File system | UPnP content |
|---|---|
| File name | Title (convert to 8.3 format) → follow rules of SD_VIDEO/DCIF/SD_AUDIO |
| Attribute | If file can be made open, set "read only" or "archive" as attribute |
| Creation date | Set acquisition date if it is unavailable by Browse |
| Final access date | Set acquisition date if it is unavailable by Browse |
| Update date | Set acquisition date if it is unavailable by Browse |
| Starting cluster number | Create dummy file for network on SD card and set its cluster |
| File length | Deal with by handling only content items having a displayable size of, e.g., 4 bytes |

F I G. 14

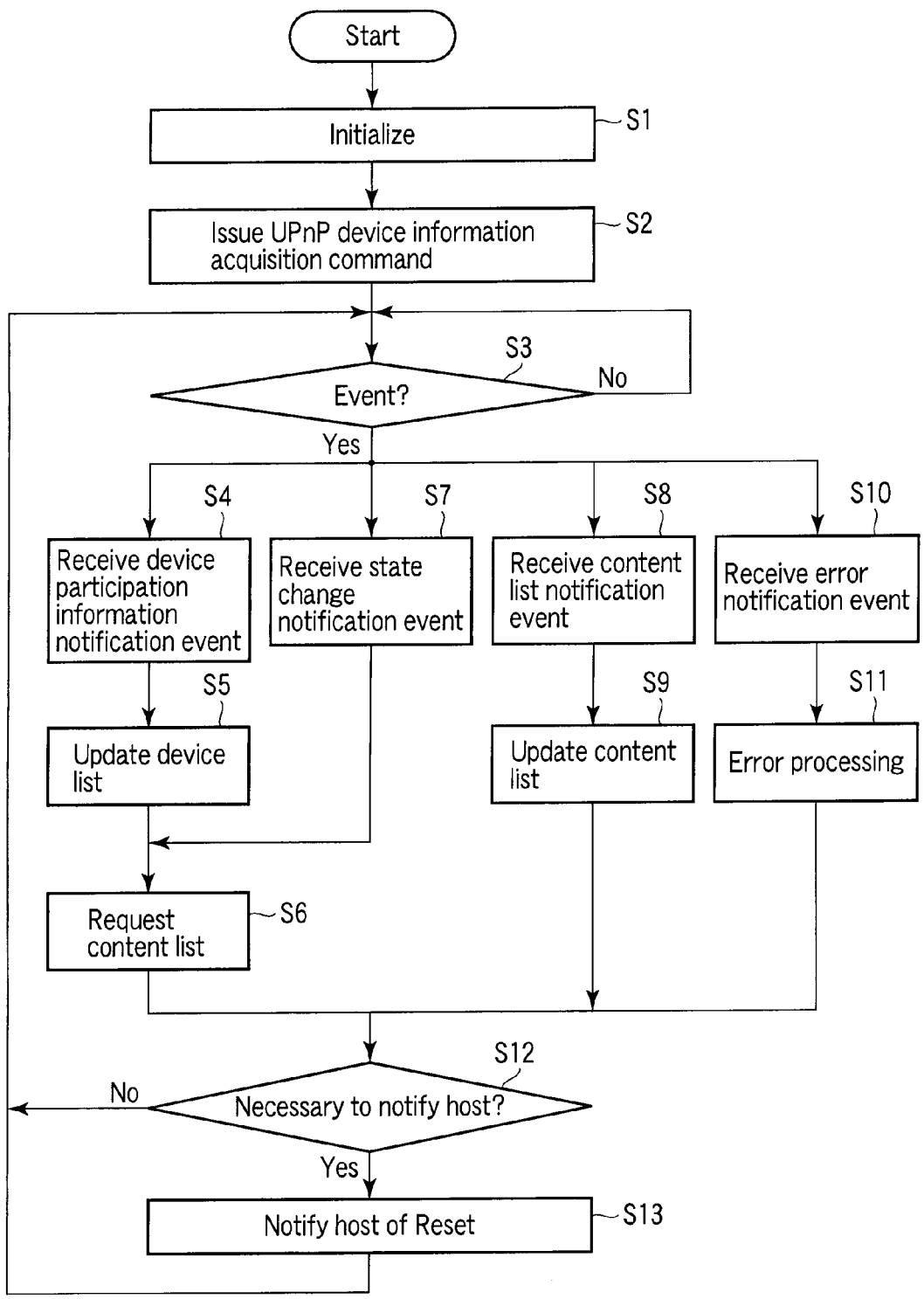
F I G. 18

ELECTRONIC APPARATUS AND CONTENT DATA PROVIDING METHOD

CROSS-REFERENCE TO RELATED APPLICATIONS

This application is based upon and claims the benefit of priority from Japanese Patent Application No. 2008-132057, filed May 20, 2008, the entire contents of which are incorporated herein by reference.

BACKGROUND

1. Field

One embodiment of the invention relates to an electronic apparatus which is connected to a host apparatus to expand the functions of the host apparatus, and a content data providing method using the electronic apparatus.

2. Description of the Related Art

In recent years, the development has been progressed rapidly for the environment for interconnecting and using digital TV apparatuses, video recorders, computers, etc. In such an environment, a user can, e.g., view TV program data recorded in a video recorder using a personal computer.

To do this, various proposals have been made so far in association with a function of browsing, on a personal computer, data recorded in a video recorder, like browsing data recorded in the personal computer. For example, Jpn. PCT National Publication No. 2006-524848 discloses a system which visualizes content data in a Universal Plug and Play (UPnP) media server using a UPnP control point having an expanded file system service.

A system including digital appliances connected via a wireless LAN is also commonly used recently. In this case, for example, TV program data recorded in a video recorder can be wirelessly transferred to another device such as a personal computer, and the user can enjoy a movie or the like anywhere.

However, to send a content data recorded in a digital appliance to a device by wireless communication and play it, the device must additionally have a wireless communication function and a UPnP function. Even a device having a function of playing back content data requires large improvement of its operating system or the file service function of the operating system to easily use the content data in an external device such as a digital appliance.

It is therefore demanded to implement a new function of allowing an existing device to handle content data in an external device without any improvement.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 7 is an exemplary block diagram showing the configuration of a FAT entry generation module provided in the data merge module shown in FIG. 5;

FIG. 8 is an exemplary block diagram showing the configuration of a host apparatus connected to the electronic apparatus according to the embodiment;

FIG. 12 is an exemplary view showing an example of file list information managed by the electronic apparatus according to the embodiment;

FIG. 13 is an exemplary view showing an example of device list information managed by the electronic apparatus according to the embodiment;

FIG. 14 is an exemplary view for explaining conversion rules used by the electronic apparatus according to the embodiment;

FIG. 18 is an exemplary flowchart for explaining the procedure of content information collection processing executed by the electronic apparatus according to the embodiment;

DETAILED DESCRIPTION

Various embodiments according to the invention will be described hereinafter with reference to the accompanying drawings. In general, according to one embodiment of the invention, there is provided an electronic apparatus detachably connected to a host apparatus, comprising: a wireless communication device configured to execute wireless communication with an external device; an information acquisition module configured to acquire, by wireless communication with the external device, metadata corresponding to content data which the external device is able to provide; a file management information generation module configured to generate, based on the acquired metadata, file management information based on which the host apparatus recognizes the content data as a file stored in a storage medium in the electronic apparatus; and an access control module configured to, upon receiving a read request for a file corresponding to the content data, which is transmitted from the host apparatus based on the file management information, execute external device access processing of acquiring the content data from the external device using the wireless communication device, and output the acquired content data to the host apparatus.

Figure 1:
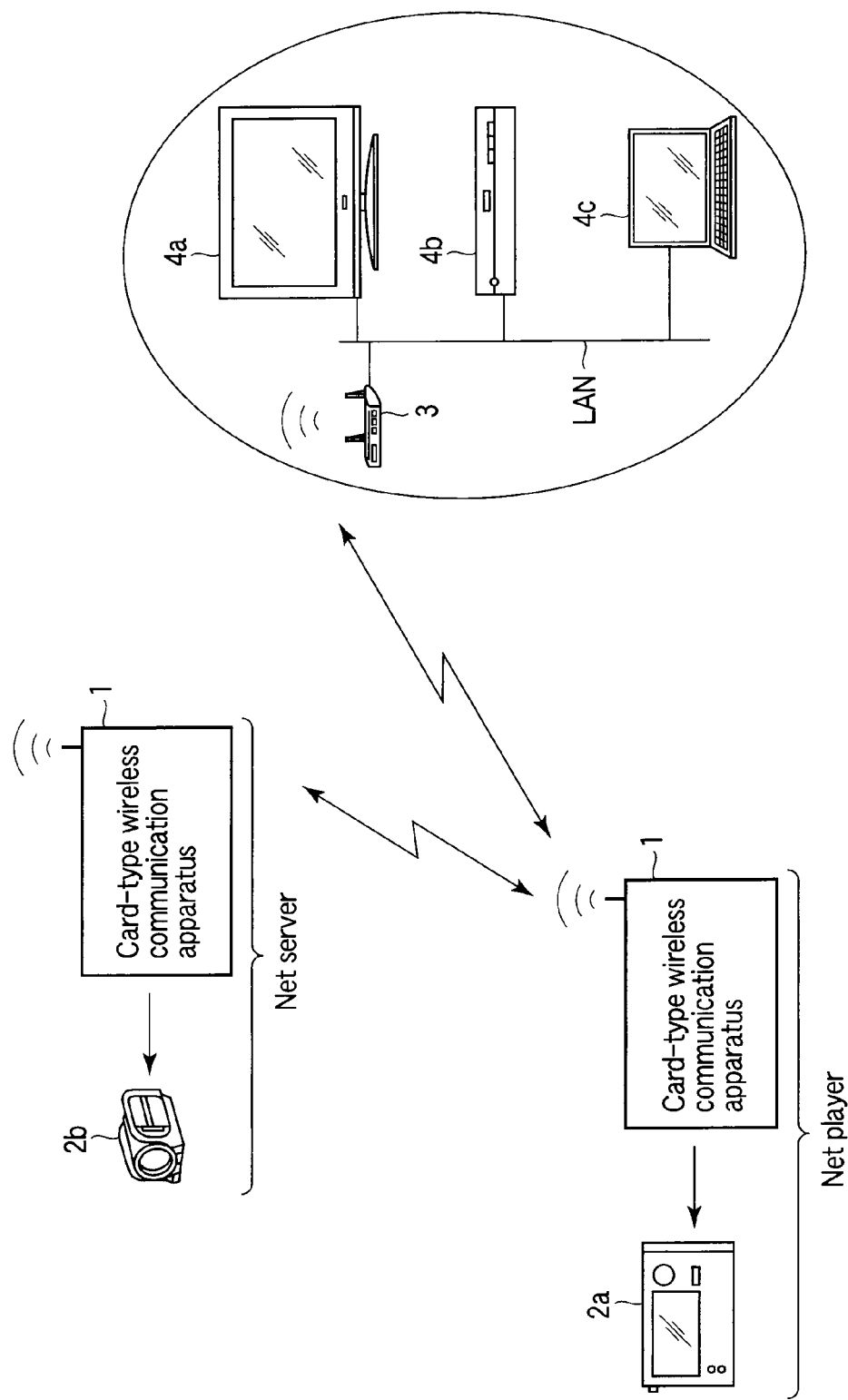
FIG. 1 is an exemplary block diagram showing the arrangement of a network system using an electronic apparatus according to an embodiment of the invention.

FIG. 1 shows an example of the arrangement of a network system using an electronic apparatus according to an embodiment of the present invention. This network system is a home network system to connect digital devices such as a consumer electronic machine, portable device, and personal computer in a home to each other. The electronic apparatus is a device designed to be detachably connected to a host apparatus such as a portable device or a personal computer. The electronic apparatus is implemented as, e.g., a card-type wireless communication apparatus 1. The card-type wireless communication apparatus 1 has a wireless communication function like a wireless LAN, and a content networking function of acquiring content data from an external device in accordance with, e.g., UPnP specifications. A host apparatus to which the card-type wireless communication apparatus 1 is attached is wirelessly connected to an external device such as a media server to handle content data such as video data and audio data held in the external device.

For example, when the card-type wireless communication apparatus 1 is connected to a portable AV player 2a, as shown in FIG. 1, the portable AV player 2a can function as a net player (also referred to as a UPnP media player) capable of acquiring content data from an external device such as a UPnP media server and playing it. When the card-type wireless communication apparatus 1 is connected to, e.g., a digital camera 2b, the digital camera 2b can function as a net server (UPnP media server) capable of providing, to a net player, content data such as a still image or a moving image obtained upon image-capturing executed by the digital camera 2b.

The card-type wireless communication apparatus 1 is formed from a small card device such as an SD card and can be attached to the card slots of various portable devices. The card-type wireless communication apparatus 1 has a predetermined file system. The host apparatus, i.e., the portable device to which the card-type wireless communication apparatus 1 is attached can recognize the card-type wireless communication apparatus 1 as a storage device such as a removable storage device.

In the home network system shown in FIG. 1, each of a digital TV 4a, video recorder 4b, and personal computer 4c has a UPnP function. Each of the digital TV 4a, video recorder 4b, and personal computer 4c can function as a UPnP media server, a UPnP media player, or both a UPnP media server and a UPnP media player.

The digital TV 4a, video recorder 4b, and personal computer 4c are connected to a network such as a LAN. A wireless access point 3 is also connected to the network. The card-type wireless communication apparatus 1 can execute wireless communication with the devices 4a, 4b, and 4c on the network via the wireless access point 3. Note that each of the digital TV 4a, video recorder 4b, and personal computer 4c may have a wireless function.

Figure 2:
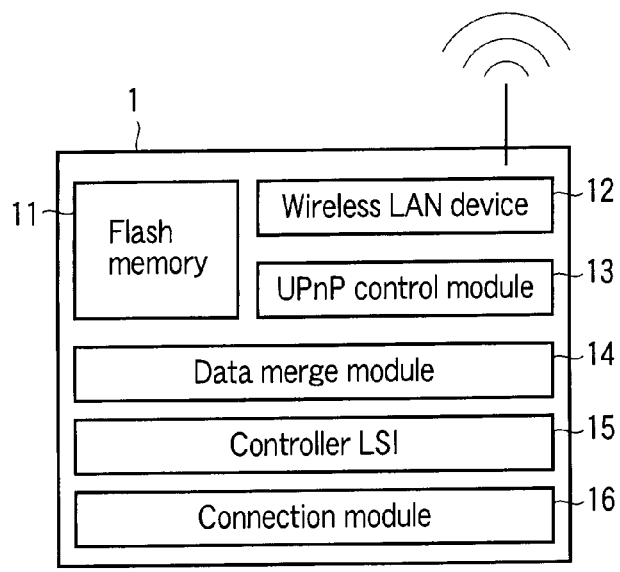
FIG. 2 is an exemplary block diagram showing a configuration of the electronic apparatus according to the embodiment.

FIG. 2 shows an example of the configuration of the card-type wireless communication apparatus 1.

Referring to FIG. 2, the card-type wireless communication apparatus 1 is assumed to be implemented by an SD card (also referred to as a secure digital memory card) which functions as a removable storage device.

The card-type wireless communication apparatus 1 includes a flash memory 11, wireless LAN device 12, UPnP control module 13, data merge module 14, controller LSI 15, and connection module 16.

The flash memory 11 is a nonvolatile storage device such as a flash EEPROM capable of storing various kinds of data. The flash memory 11 is used as the storage medium of the card-type wireless communication apparatus 1. Files stored in the flash memory 11 are managed by a file system such as a FAT file system.

File management information (also referred to as file system information) for managing the files stored in the flash memory 11 is stored in the flash memory 11. More specifically, the flash memory 11 has a data storage area and a file management information storage area. The data storage area is a memory area for storing files. The file management information storage area is a memory area for storing file management information for managing the files stored in the data storage area.

File management information contains directory entry information corresponding to each file, and file allocation table (FAT) information representing the storage location of each file in the data storage area. Directory entry information corresponding to each file contains information such as the file name, attribute, creation date/time, size, and starting cluster number of the corresponding file. The starting cluster number is the number of a cluster (storage location) where the first data block of the file is stored. The file allocation table information includes information for managing the storage location of the file on the flash memory 11 in units of a predetermined data size (in units of a data block), such as a cluster, on a file-by-file basis. More specifically, the file allocation table information represents a plurality of storage locations (plurality of cluster numbers) in the flash memory 11 where a plurality of data blocks included in a file are stored, and the chain of the plurality of storage locations (plurality of cluster numbers). One data block corresponds to one cluster. The storage locations of a plurality of data blocks included in one file are represented by the numbers of clusters where the data blocks are stored. One cluster includes at least one sector.

A file service program provided in the operating system of a host apparatus can access each file stored in the flash memory 11 by looking up the file management information of the card-type wireless communication apparatus 1.

The wireless LAN device 12 is a wireless communication device which executes wireless communication with an external device. The wireless LAN device 12 executes wireless communication with an external device in accordance with, e.g., the IEEE.801 standard. The UPnP control module 13 executes communication with each external device on the home network using the wireless LAN device 12. The UPnP control module 13 executes processing of discovering an external device such as a UPnP media server and processing of collecting content data (e.g., video data, audio data, and image data) which the discovered external device can provide, or the metadata of the content data. Metadata is information representing the features (properties) of corresponding content data, and includes information of, e.g., the title, size, artist name, and creation date of the content data, and a content protection method set for the content data.

The data merge module 14 generates file management information (file management information for UPnP content) for causing the content data, which the UPnP media server can provide, to appear on the host apparatus as if this content data were a file stored in the card-type wireless communication apparatus 1. Based on the file management information (UPnP content file management information), the host apparatus recognizes the content data held in the UPnP media server as a file stored in the card-type wireless communication apparatus 1. Although the entity of content data exists in the UPnP media server, the content data is managed by the file management information as a file (virtual file) stored in the flash memory 11. The file management information (UPnP content file management information) has the same data structure as the above-described file management information (SD file management information) which manages the files actually stored in the data storage area of the flash memory 11. To manage content data as a virtual file, the UPnP content file management information contains directory entry information relating to the file (virtual file) corresponding to content data, and file allocation table information relating to the file corresponding to content data. The file allocation table information includes information which is indicative of a plurality of storage locations in the flash memory 11, which correspond to a plurality of data blocks constituting the file corresponding to the content data.

The data merge module 14 merges SD file management information for managing normal files whose entities are stored in the flash memory 11 with the generated UPnP content file management information, thereby generating single file management information. The generated single file management information is provided to the host apparatus. The host apparatus can handle both the content data in the UPnP media server and the files actually stored in the flash memory 11 as files in the flash memory 11. In other words, the host apparatus recognizes each content data item in the UPnP media server as a file in the flash memory 11 based on the file management information.

The controller LSI executes read/write access to the flash memory 11 in accordance with a memory access command received from the host apparatus via the connection module 16. The connection module 16 is an interface module to execute interface to the host apparatus. The connection module 16 is used to connect a wired communication path between the host apparatus and the card-type wireless communication apparatus 1. When the card-type wireless communication apparatus 1 is attached to the host apparatus, the connection module 16 is electrically and physically connected to the host apparatus. The connection module 16 executes communication with the host apparatus to receive commands and data from the host apparatus or transmit data to the host apparatus.

Figure 3:
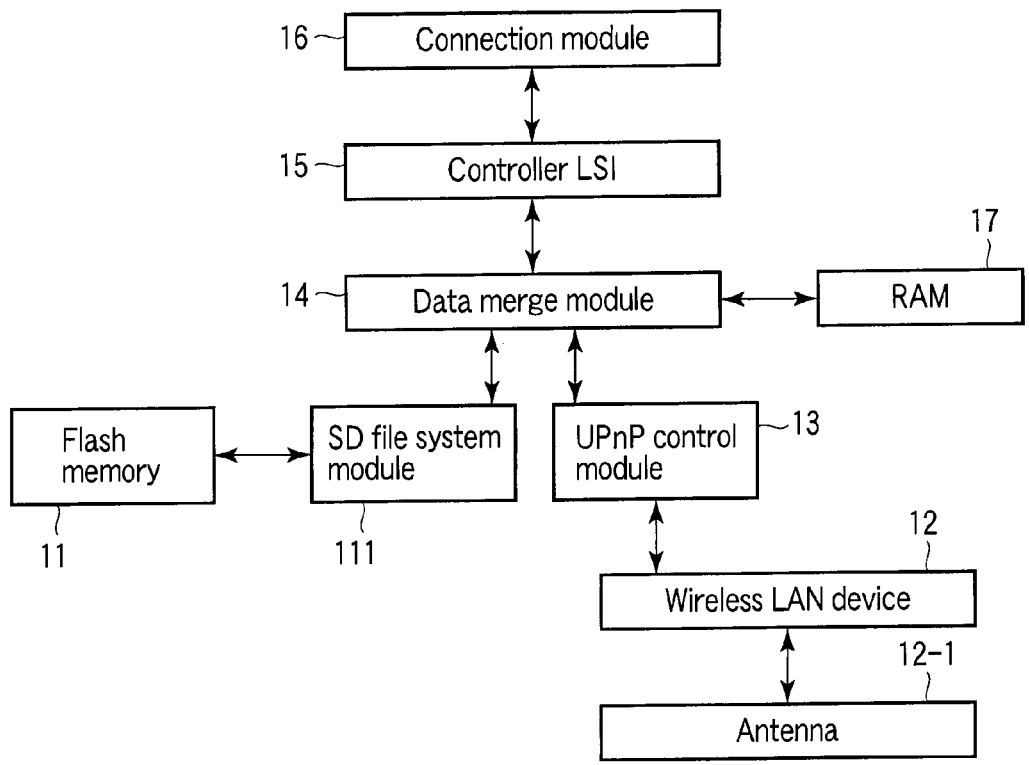
FIG. 3 is an exemplary block diagram showing a detailed example of the configuration of the electronic apparatus according to the embodiment.

FIG. 3 shows a detailed example of the configuration of the card-type wireless communication apparatus 1.

In the configuration shown in FIG. 3, the data merge module 14 is arranged between the controller LSI 15 and the flash memory 11. The data merge module 14 executes processing of merging file management information (SD file management information) acquired from the flash memory 11 via a file system module 111 and file management information (UPnP content file management information) corresponding to content data acquired from the media server by the UPnP control module 13 into one file system.

Upon receiving a read request from the host apparatus via the controller LSI 15, the data merge module 14 executes processing of switching the access destination between the flash memory 11 and the media server.

More specifically, if the storage location (e.g., cluster number) of a read target data block designated by a read request transmitted from the host apparatus belongs to the range of storage locations managed by the file allocation table information (FAT information) in the SD file management information, the data merge module 14 accesses the flash memory 11. In this case, the data merge module 14 reads, from the storage location on the data storage area of the flash memory 11 which is designated by the read request, the data block of the file, whose entity is actually present in this data storage area, and outputs the read data block to the host apparatus.

On the other hand, if the storage location (e.g., cluster number) of a read target data block designated by a read request transmitted from the host apparatus belongs to the range of storage locations managed by the UPnP content file management information, the data merge module 14 executes, using the wireless LAN device 12, external device access processing of acquiring content data from the media server. The wireless LAN device 12 is connected to an antenna 12-1 provided in the card-type wireless communication apparatus 1.

In the external device access processing, for example, the data merge module 14 acquires content data from the media server and stores the acquired content data in a RAM 17 serving as a buffer or in the data storage area of the flash memory 11. The data merge module 14 outputs, to the host apparatus, only a data block in the content data corresponding to the storage location designated by the read request from the host apparatus.

Note that the data merge module 14 may acquire, from the media server, only the data block in the content data corresponding to the storage location designated by the read request from the host apparatus. Alternatively, the data merge module 14 may acquire, from the media server, a predetermined number of data blocks starting from the data block in the content data corresponding to the storage location designated by the read request from the host apparatus.

Figure 4:
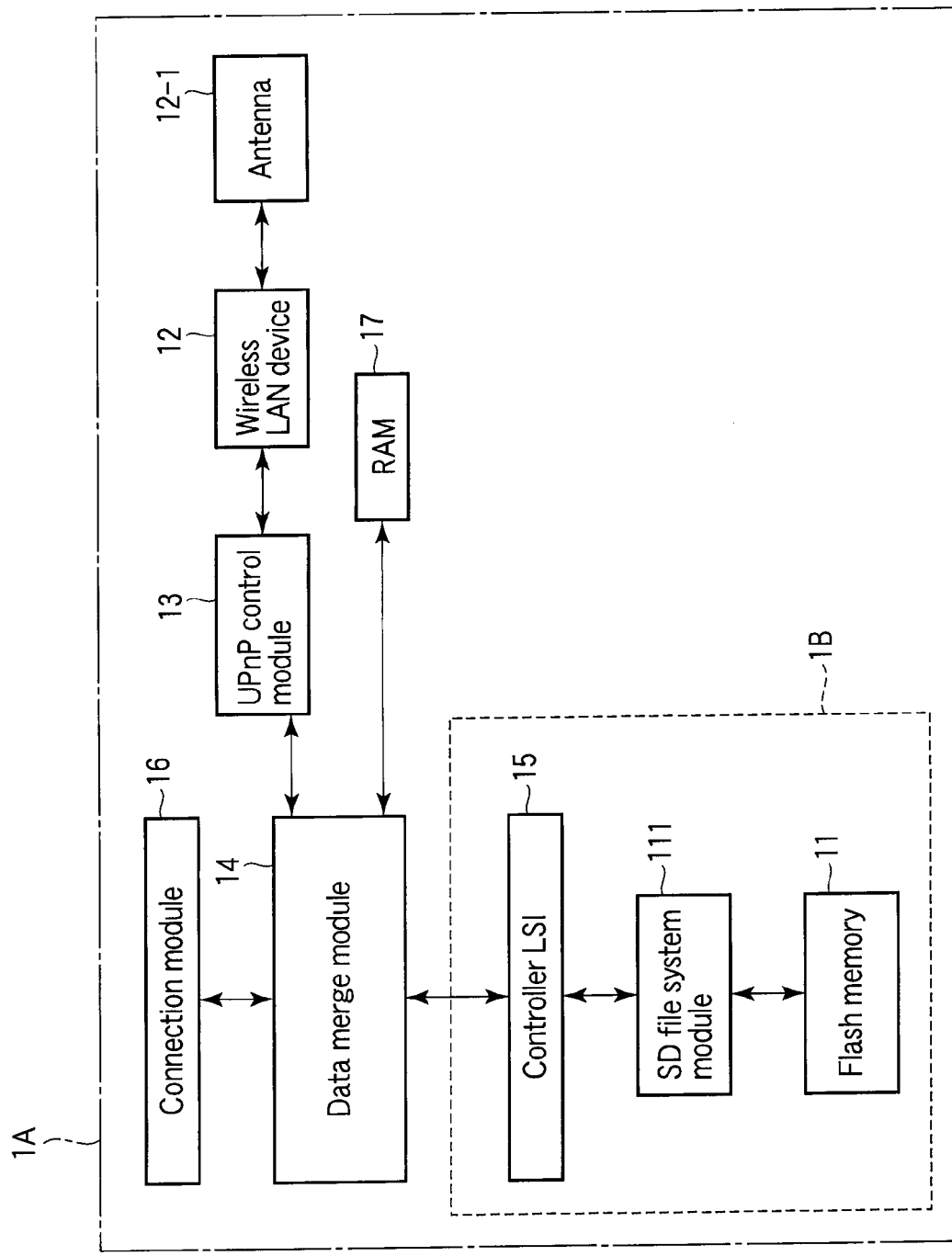
FIG. 4 is an exemplary block diagram showing another detailed example of the configuration of the electronic apparatus according to the embodiment.

FIG. 4 shows another detailed example of the configuration of the card-type wireless communication apparatus 1.

In the configuration shown in FIG. 4, the data merge module 14 is arranged between the connection module 16 and the controller LSI 15. A module 1B including the controller LSI 15, SD file system module 111, and flash memory 11 has almost the same arrangement as a normal memory card (e.g., a Mini SD card or Micro SD card). Hence, when the arrangement in FIG. 4 is employed, a module 1A including the connection module 16, data merge module 14, UPnP control module 13, wireless LAN device 12, antenna 12-1, and RAM 17 can be implemented as an adapter to which a normal memory card (the module 1B) is detachably attached.

Figure 5:
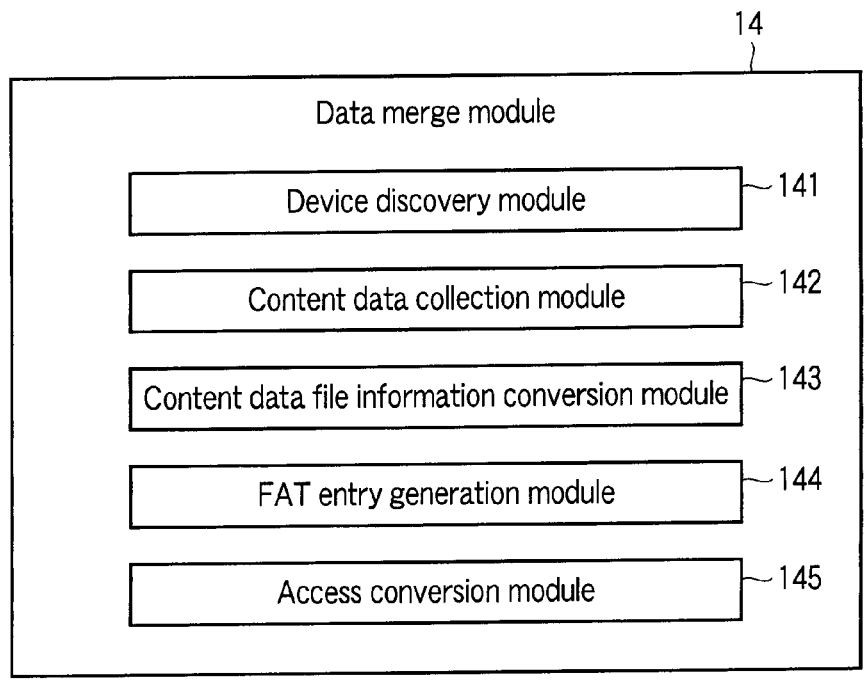
FIG. 5 is an exemplary block diagram showing the configuration of a data merge module provided in the electronic apparatus according to the embodiment.

FIG. 5 shows the arrangement of the data merge module 14.

The data merge module 14 includes a device discovery module 141, a content data collection module 142, a content data file information conversion module 143, a FAT entry generation module 144, and an access conversion module 145.

The device discovery module 141 executes device discovery processing of discovering external devices (UPnP devices) on the network in cooperation with the UPnP control module 13. By the device discovery processing, devices (media servers) capable of wirelessly being connected to the wireless LAN device 12 and providing content data are discovered. The device discovery processing is also called browsing processing. In the actual device discovery processing, not only the media server but also the above-described media player, a device (media renderer) having a function of playing back or rendering content data, and a device (media controller) for settling up connection between the media server and the media renderer are discovered.

The device discovery module 141 manages device classes (media server, media player, media renderer, and media controller) corresponding to the discovered devices, and the net addresses, capabilities, and the like of the discovered devices using device list information shown in FIG. 13. More specifically, the device discovery module 141 manages the IDs (names), IP addresses, classes (media server, media player, media renderer, and media controller), and capabilities (content data download capability [DNL], content data upload capability [UPL], and content data streaming capability [blank]) of the UPnP devices, and the media format types and content protection system types (e.g., DTCP, and WMDRM) corresponding to the UPnP devices, as shown in FIG. 13.

The content data collection module 142 collects content information from each media server discovered by the device discovery module 141 and manages the information. More specifically, the content data collection module 142 executes information acquisition processing of acquiring, by wireless communication with each media server, metadata corresponding to content data which the media server can provide. With the information acquisition processing, the content data collection module 142 generates information representing the list of usable content data items.

The content data file information conversion module 143 generates file management information (UPnP content file management information) in cooperation with the FAT entry generation module 144. The file management information (UPnP content file management information) is information for managing the usable content data as if the usable content data is stored the flash memory 11, and for allowing the host apparatus to recognize the usable content data as a file stored the flash memory 11. More specifically, to make content data look like a file stored in the flash memory 11, the content data file information conversion module 143 generates directory entry information representing the file name, attribute, creation date/time, size, and the like of the file based on the metadata of the content data. If information necessary for directory entry information generation is deficient, processing of complementing the deficient information is executed automatically.

Figure 6:
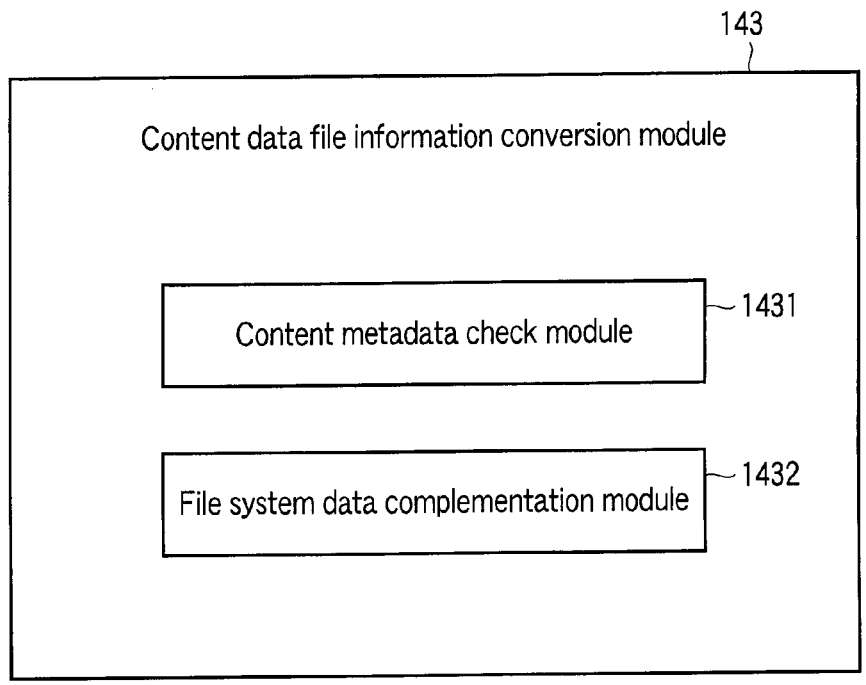
FIG. 6 is an exemplary block diagram showing the configuration of a content data file information conversion module provided in the data merge module shown in FIG. 5.

More specifically, the content data file information conversion module 143 includes a content metadata check module 1431 and a file system data complementation module 1432, as shown in FIG. 6. The content metadata check module 1431 checks metadata and extracts, from it, information (e.g., title name, attribute, data size, and the like) necessary for generating directory entry information of the file corresponding to the content data. The file system data complementation module 1432 executes processing of editing the extracted information and processing of complementing deficient information.

The directory entry information generated by the content data file information conversion module 143 is added to the directory table in the file management information storage area of the flash memory 11.

The FAT entry generation module 144 generates file allocation table information for managing, in units of a data block such as a cluster, the storage location of the file corresponding to the content data. The file allocation table information represents a plurality of storage locations (plurality of cluster numbers) corresponding to a plurality of data blocks included in a file corresponding to content data using cluster numbers belonging to a predetermined cluster number range assigned to the file corresponding to the content data. The file allocation table information generated by the FAT entry generation module 144 is added to the file allocation table in the file management information storage area of the flash memory 11.

More specifically, the FAT entry generation module 144 includes a total FAT table reservation module 1441, SD file mapping module 1442, and UPnP content mapping module 1443, as shown in FIG. 7. The total FAT table reservation module 1441 determines the total size necessary for the FAT table and reserves it, based on the file management information (SD file management information) acquired from the flash memory 11 and the file management information (UPnP content file management information) corresponding to content data acquired from the media server by the UPnP control module 13. The SD file mapping module 1442 maps the SD file management information in an SD area in the FAT table reserved by the total FAT table reservation module 1441. The UPnP content mapping module 1443 maps the UPnP content file management information in an UPnP area in the FAT table reserved by the total FAT table reservation module 1441.

The access conversion module 145 shown in FIG. 5 manages the range of storage locations assigned to a file (SD file) group actually stored in the data storage area of the flash memory 11 and the range of storage locations assigned to files corresponding to UPnP content data using a management table shown in FIG. 12. The access conversion module 145 determines, by looking up the management table shown in FIG. 12, a file that corresponds to the storage location range, to which the storage location designated by the access request from the host apparatus belongs. On the basis of the determination result, the access conversion module 145 switches the access target between the flash memory 11 and each of plural media servers.

FIG. 8 shows an example of the configuration of a host apparatus.

Assume that the host apparatus is the portable AV player 2a in FIG. 1. The host apparatus 2a includes a main controller 21, display controller 22, video encoder/decoder 23, card host controller 24, card slot 25, and display device 26 such as an LCD.

The main controller 21 controls the operation of the host apparatus 2a. The main controller 21 includes a CPU and a RAM. The CPU is a processor for executing various programs. The programs executed by the CPU include an operating system and application programs for playing back video data, audio data, and image data. The operating system includes a file service program. The operating system reads file management information from a card device inserted in the card slot 25 via the file service program and issues an access request (read/write/seek) to the card device in accordance with the file management information.

The display controller 22 generates a video signal which forms an image to be displayed on the display screen of the display device 26 by executing rendering processing. The video encoder/decoder 23 executes processing of encoding video data and decoding compressed video data. The card host controller 24 controls a card device such as an SD card inserted in the card slot 25.

When the card-type communication apparatus 1 of this embodiment is inserted in the card slot 25, the host apparatus 2a can use not only files actually stored in the card-type communication apparatus 1 but also content data held by the external devices on the home network. The card-type communication apparatus 1 stores file management information based on which the host apparatus 2a recognizes the files stored in the card-type communication apparatus 1 and the content data held by the external devices as one file system.

By referring to the file management information, the host apparatus 2a can access the content data held by the external devices as if they were files stored in the card-type communication apparatus 1.

When the card-type communication apparatus 1 is inserted in the card slot 25, the card host controller 24 detects the attachment of the card-type communication apparatus 1 and notifies the main controller 21 that a card device attachment event has occurred. The main controller 21 reads file management information from the card-type communication apparatus 1 via the card host controller 24, and based on the file management information, mounts the card-type communication apparatus 1 (SD card) on the file system managed by the operating system of the host apparatus 2a.

After that, when the user selects a file managed by the file management information of the card-type communication apparatus 1 (a file actually stored in the card-type communication apparatus 1 or content data (virtual file) held by an external device), the main controller 21 transmits a read request to read the selected file to the card-type communication apparatus 1 via the card host controller 24. If the file designated by the read request is a file actually stored in the flash memory 11 of the card-type communication apparatus 1, the data of the file is read from the flash memory 11 and sent from the card-type communication apparatus 1 to the host apparatus 2a. If the file designated by the read request is a file corresponding to content data on an external device, wireless communication between the card-type communication apparatus 1 and the external device is executed to acquire the content data from the external device. The acquired content data is sent from the card-type communication apparatus 1 to the host apparatus 2a.

If the file (a file actually stored in the card-type communication apparatus 1 or content data (virtual file) held by an external device) read from the card-type communication apparatus 1 is video data, the video encoder/decoder 23 decodes the video data. The display controller 22 displays the decoded video data on the display screen of the display device 26.

Figure 9:
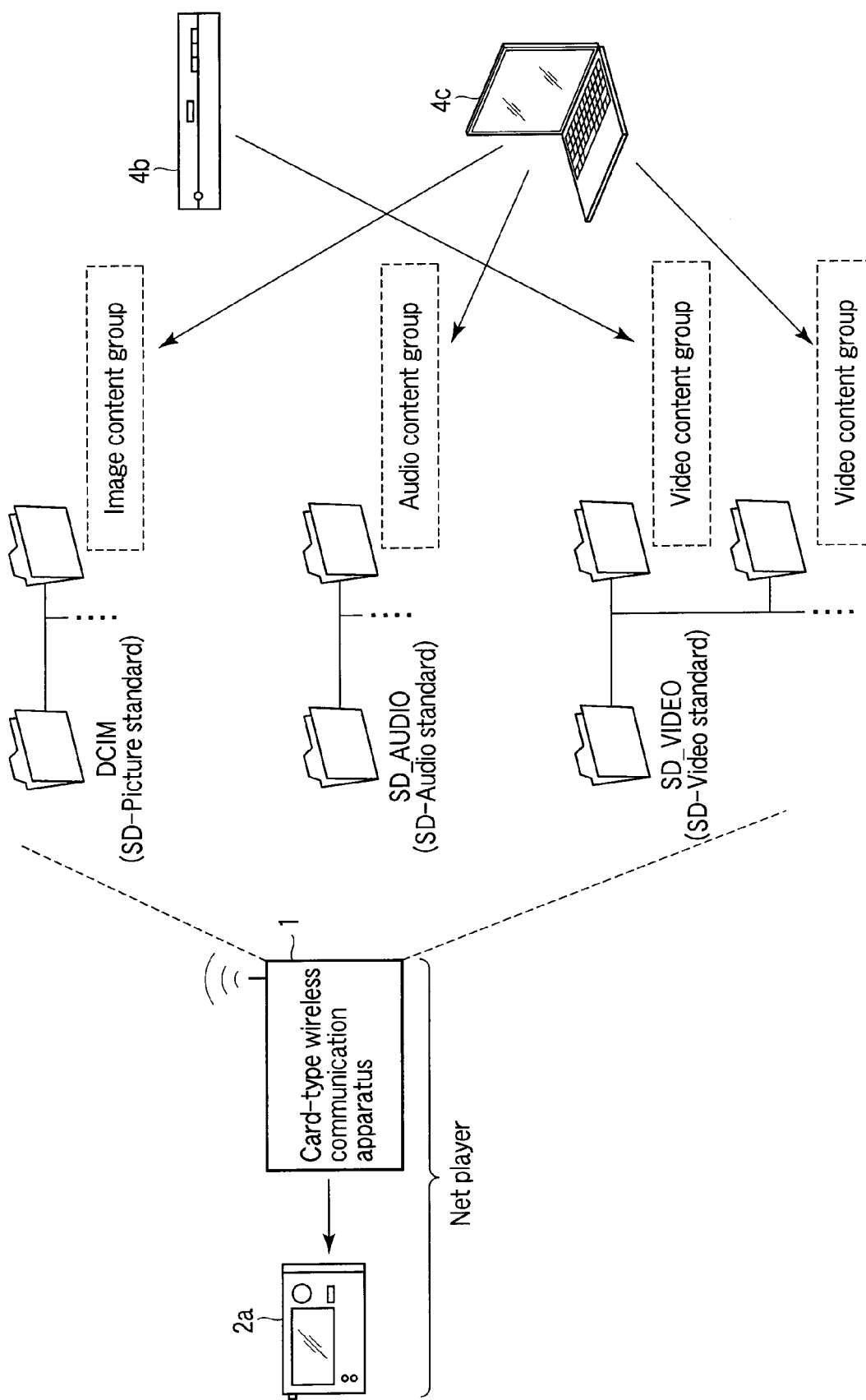
FIG. 9 is an exemplary view showing the manner the electronic apparatus according to the embodiment manages content data as files.

FIG. 9 is a conceptual view showing the manner the card-type wireless communication apparatus 1 attached to the portable AV player 2a presents content data providable by the video recorder 4b and the personal computer 4c each functioning as a UPnP media server to the portable AV player 2a serving as a host apparatus as if they were files stored in the flash memory 11 of the card-type wireless communication apparatus 1.

In the SD card standard, it is stipulated that the respective kinds of content data, i.e. image data, audio data and video data, are disposed under the "DCIM" directory (SD-Picture standard), "SD_AUDIO" directory (SD-Audio standard) and "SD_VIDEO" directory (SD-Video standard) according to the kinds. The data merge module 14 executes update control of file management information containing directory entry information and a file allocation table for each content data to make the host apparatus recognize as if image data providable by a UPnP media server were present under the "DCIM" directory, audio data providable by a UPnP media server were present under the "SD_AUDIO" directory, and video data providable by a UPnP media server were present under the "SD_VIDEO" directory. A detailed method of assigning image data, audio data, and video data under the predetermined directories will be described later.

The file management information update control executed by the card-type wireless communication apparatus 1 will be described next with reference to FIGS. 10 and 11.

Figure 10:
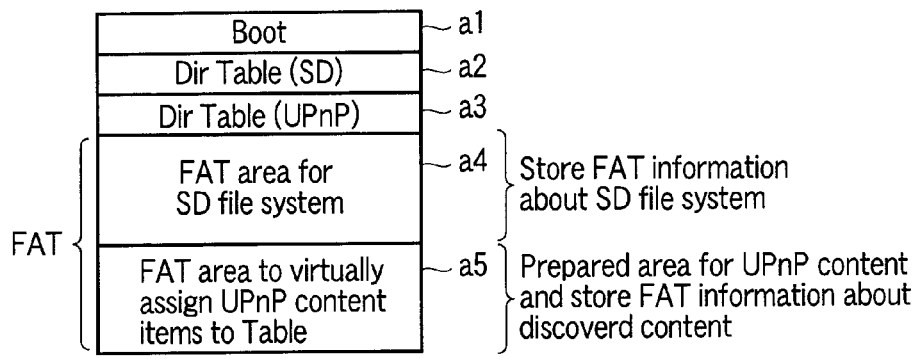
FIG. 10 is an exemplary view showing a data structure in the file management information storage area of a storage medium provided in the electronic apparatus according to the embodiment.

FIG. 10 shows a data structure in the file management information storage area allocated in the flash memory 11. As shown in FIG. 10, the file management information storage area has a Boot area a1 for activation processing, a Dir Table (SD) area a2 for storing directory entry information about each file stored in the data storage area of the flash memory 11, a Dir Table (UPnP) area a3 for storing directory entry information about each content data item providable by a UPnP media server, a FAT area a4 for storing a file allocation table associated with each file stored in the data storage area of the flash memory 11, and a FAT area a5 for storing a file allocation table associated with each content data item providable by a UPnP media server. The Dir Table (SD) area a2 and the Dir Table (UPnP) area a3 form one directory table. The FAT areas a4 and a5 form one file allocation table. The Dir Table (SD) area a2, Dir Table (UPnP) area a3, and FAT areas a4 and a5 form an item of file management information (file system information).

Upon discovering a UPnP media server and content data providable by the UPnP media server, the data merge module 14 in the card-type wireless communication apparatus 1 assigns the content data to a free entry of the Dir Table (UPnP) area a3 and allocates, in the file allocation table in the FAT area a5, a plurality of areas representing the chain of a plurality of consecutive cluster numbers in number corresponding to the data size of the content data.

A detailed example will be described. Assume that a UPnP media server is discovered, and content data upnp1.mp2 is discovered as content data providable by the UPnP media server. In this case, the data merge module 14 assigns upnp1.mp2 to one entry of the Dir Table (UPnP) area a3 and allocates, in the file allocation table in the FAT area a5, a plurality of areas (a plurality of FAT entries) representing the chain of a plurality of consecutive cluster numbers in number corresponding to the data size of upnp1.mp2, and for example, 88 consecutive FAT entries corresponding to cluster numbers 512 to 599, as shown in FIG. 11. The 88 consecutive FAT entries corresponding to cluster numbers 512 to 599 are used to represent storage locations in the flash memory 11 corresponding to the plurality of data blocks included in the content data upnp1.mp2. Cluster number 512 is set in an entry of the Dir Table (UPnP) area a3 corresponding to the content data upnp1.mp2 as the starting cluster number representing the storage location corresponding to the starting data block of the content data upnp1.mp2. FIG. 11 shows an example in which content data upnp2.mp2 is discovered next to upnp1.mp2.

Access conversion processing upon receiving, from the host apparatus, a request to read upnp1.mp2 will be described next.

Figure 11:
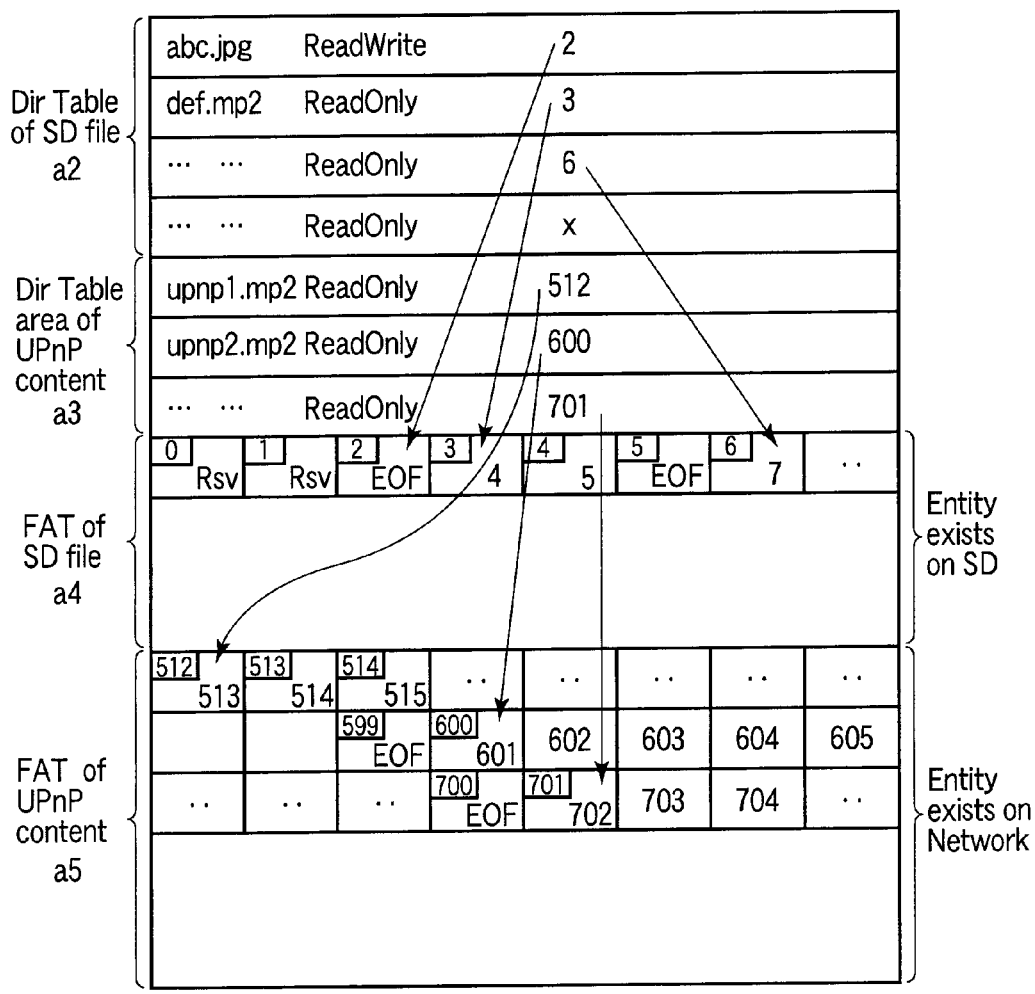
FIG. 11 is an exemplary view showing examples of file allocation table (FAT) and directory table included in the file management information storage area in FIG. 10.

To read upnp1.mp2, the host apparatus which accesses a file stored in the flash memory 11 by referring to the file management information shown in FIG. 11 first requests the card-type wireless communication apparatus 1 to read data of the cluster of the starting cluster number, i.e., cluster No. 512, which is stored in the entry of the Dir Table (UPnP) area a3 to which upnp1.mp2 has been assigned.

When the data merge module 14 of the card-type wireless communication apparatus 1 discovers the UPnP media server and content data and stores file management information relating to this content data in the manner as described above, the data merge module 14 creates and manages a file list as shown in FIG. 12. By referring to the file list, the data merge module 14 recognizes that the requested data is content data in the UPnP media server. The data merge module 14 also generates and manages the device list shown in FIG. 13 for the discovered UPnP media servers. The data merge module 14 additionally generates various kinds of information in accordance with, e.g., rules shown in FIG. 14 based on the metadata of each content data item providable by each UPnP media server, and stores the information in the file management information storage area of the flash memory 11 as directory entry information. Since the data merge module 14 has the function of generating directory entry information about content data providable by a UPnP media server based on metadata, the card-type wireless communication apparatus 1 can allow the host apparatus to recognize the content data as files stored in the flash memory 11.

The rules shown in FIG. 14 will be explained in more detail. When content data has a title of more than eight characters, the first to eighth characters are used to create a file name, and a predetermined three-character extension is added in accordance with the data type such as image, audio, or video. A file attribute such as "read only" or "archive" is permanently set.

As for the file creation date/time, final access date/time, and update date/time, a date/time that can be acquired from metadata is employed. If no date/time can be acquired, the date/time when the metadata of the content data has been acquired is employed and set.

That is, the data merge module 14 has a function of complementing deficient information which cannot be acquired from metadata but should be held as a file system of a file stored in the flash memory 11.

As described above, if information which should be contained in the file management information of a file corresponding to content data cannot be generated from the acquired metadata, the data merge module 14 generates and complements the deficient information in accordance with, e.g., predetermined rules.

Referring back to FIG. 12, according to the file list shown in FIG. 12, it is understood that the data of cluster number "512" is the data in URL="192.168.2.10:/Data/Video/Upnp1", that is, the data that is held by "Server-A" according to the device list of FIG. 13. The Offset field of the file list shown in FIG. 12 stores an offset value of each content item when the UPnP media server makes the content data open as a file system. The data merge module 14 requests "Server-A" to read data from a position obtained by (designated cluster(from the host apparatus)−starting cluster(on the file management information of the target content data allocated in the flash memory 11))×cluster size+Offset        (1)

The data merge module 14 transfers the data transmitted from "Server-A" to the host apparatus. Upon receiving the data, the host apparatus checks the presence/absence of a succeeding data block and the cluster that stores the succeeding data block by referring to the area corresponding to cluster No. 512 in the file allocation table in the FAT area a5. As is apparent from the file management information shown in FIG. 11, a succeeding data block exists in cluster No. 513. Hence, the host apparatus requests the data block of cluster No. 513 of the card-type wireless communication apparatus 1. Upon receiving this request, the data merge module 14 of the card-type wireless communication apparatus 1 acquires the data block from "Server-A" and returns it to the host apparatus in accordance with the same procedure as described above.

In the above-described manner, the data merge module 14 makes content data providable by a UPnP media server look like files stored in the flash memory 11 of the card-type wireless communication apparatus 1.

In order to make the description of the file management information easy to understand, FIG. 11 shows the example in which the starting cluster number of the discovered content data (e.g. upnp1.mp2) is stored in the entry of Dir Table (UPnP) area a3. However, in the entry of the Dir Table (UPnP) area a3, the directory is also allocated. In this case, this entry stores the number of the cluster in which the information relating to the directory allocated to the entry (e.g. the file name of the file under the directory, and the starting cluster number) is recorded. Thus, the entry of this Dir Table (UPnP) area a3 stores attribute information indicative of whether the directory or the file is allocated. The data merge module 14 allocates the directory to the entry of the Dir Table (UPnP) area a3, and records the information relating to the directory in the corresponding cluster, thereby constructing a tree structure as shown in FIG. 9.

A detailed method of assigning image data, audio data, and video data under predetermined directories will be described with reference to FIGS. 15 to 17.

Figure 15:
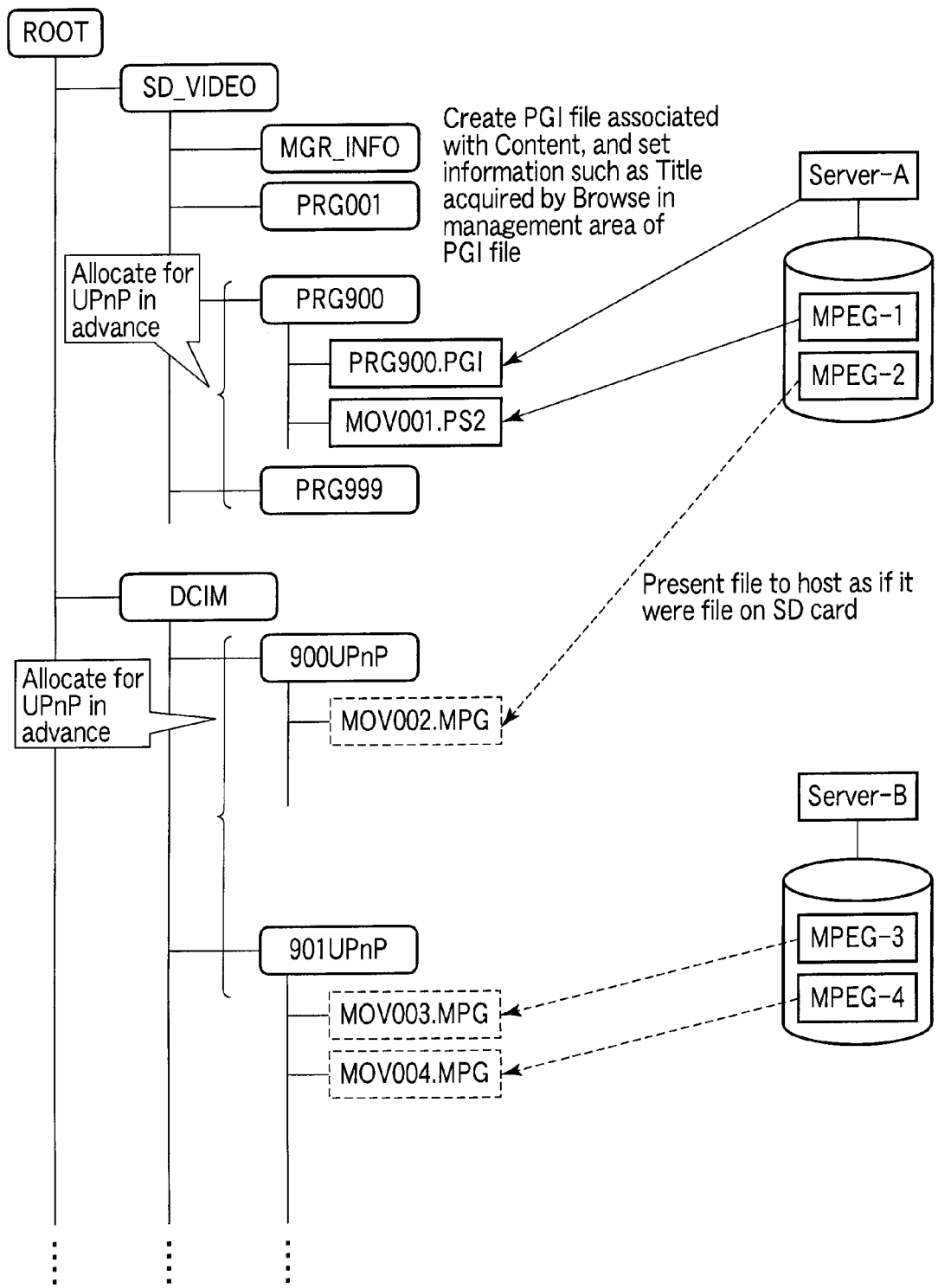
FIG. 15 is an exemplary view for explaining processing executed by the electronic apparatus according to the embodiment to assign video data on an external device to a file system.

FIG. 15 is a view for explaining a detailed method of assigning video data of content data providable by a UPnP media server.

As shown in FIG. 15, the card-type wireless communication apparatus 1 allocates in advance, under the "SD_VIDEO" directory, directories for storing content items in, e.g., UPnP media servers, and sets the attribute of the directories to "read only", thereby inhibiting write from the host apparatus. Upon discovering a UPnP media server and content data items, the card-type wireless communication apparatus 1 changes the attribute of an already allocated directory to "writable" and arranges the content items under the directory to allow the host apparatus to access the content data items without being aware that they exist in a plurality of UPnP media servers.

If a UPnP media server has disappeared from the network, a corresponding directory can be deleted to release an entry corresponding to the directory. If more directory entries are necessary, they may be allocated successively.

In the SD-Video standard, content that is handled is content data which is protected in some format, such as CPRM. In the case where video content on the UPnP media server can be converted to a format conforming to the SD-Video standard, this video content is assembled in the file system as a file under the "SD_VIDEO" directory. At a time of playback, the video content is subjected to transcription so that the video content can be viewed.

On the other hand, as regards free video data which is not protected, some other directory, for example, one directory under "DCIM" directory, as shown in FIG. 15, is secured, and the free video data is disposed under this directory so that the free video data may become available.

Figure 16:
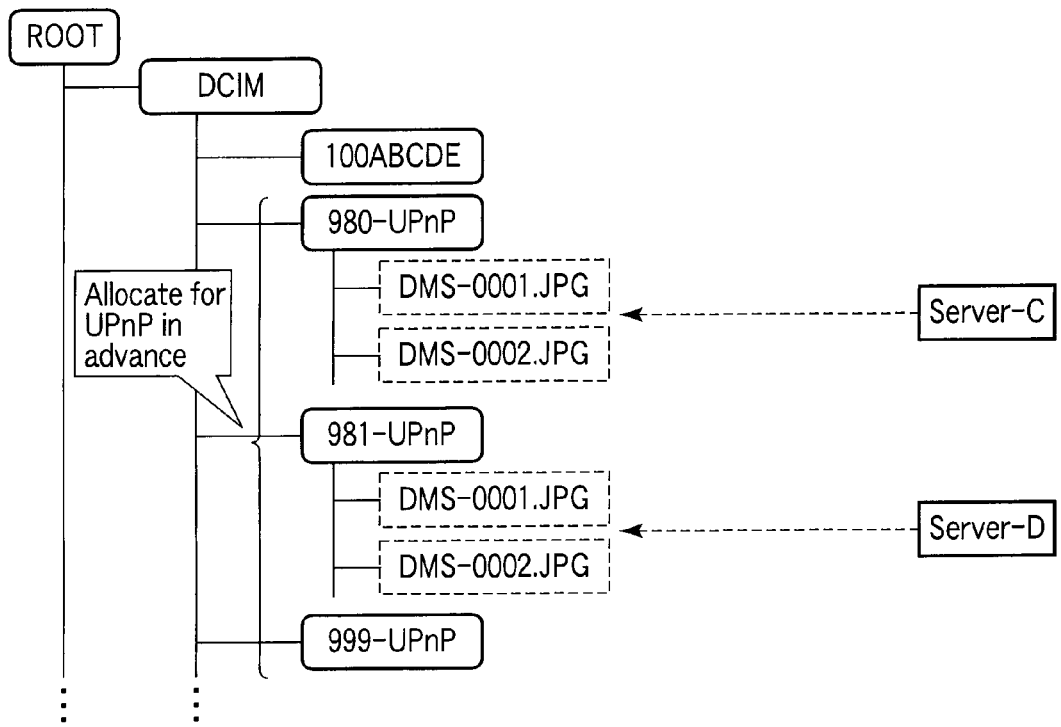
FIG. 16 is an exemplary view for explaining processing executed by the electronic apparatus according to the embodiment to assign image data on an external device to a file system.

FIG. 16 is a view for explaining a detailed method of assigning image data of content data providable by a UPnP media server.

As shown in FIG. 16, all image data stored in a UPnP media server are arranged in one directory under the "DCIM" directory. If a plurality of UPnP media servers are present, a directory is allocated for each UPnP media server, and image data are arranged under each directory to make the host apparatus unconscious of switching between the UPnP media servers.

Figure 17:
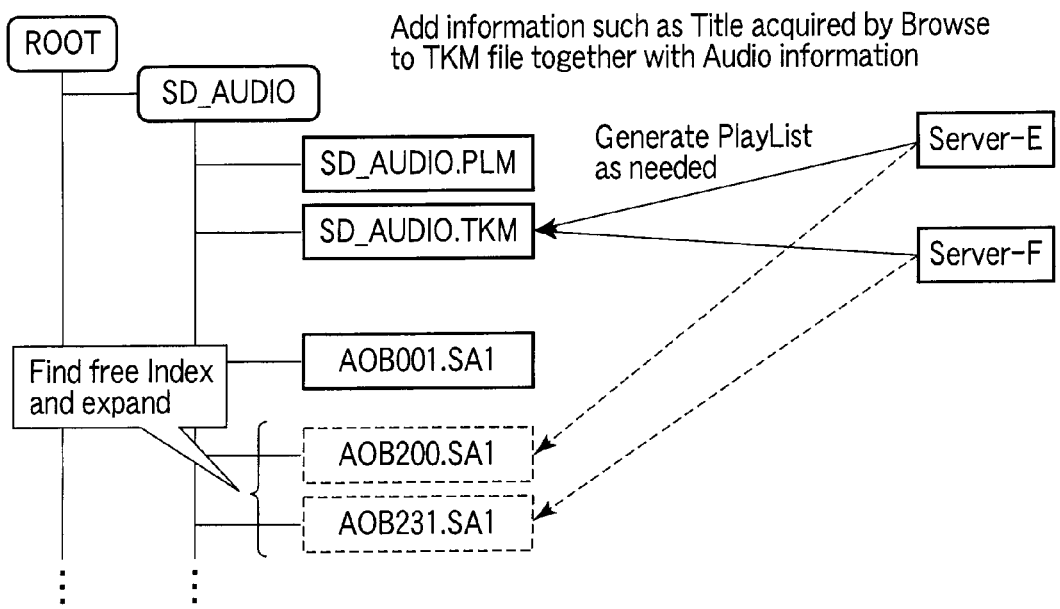
FIG. 17 is an exemplary view for explaining processing executed by the electronic apparatus according to the embodiment to assign audio data on an external device to a file system.

FIG. 17 is a view for explaining a detailed method of assigning audio data of content data providable by a UPnP media server.

The SD-Audio standard defines to arrange all files flat in the "SD_AUDIO" directory. Hence, as shown in FIG. 17, each discovered audio data is assigned to a free index found under the "SD_AUDIO" directory. Information about the audio data is added to a management file (TKM file) simultaneously with the assignment.

The SD-Audio standard also handles content data protected by a certain method such as CPRM. Hence, free audio data without protection can be arranged under another directory.

As has been described above, the data merge module 14 of the card-type wireless communication apparatus 1 has the function of disposing the content data, which the UPnP media server can provide, under a predetermined directory, according to the directory structure rules for storing in the flash memory 11 various data files of images, audio and video in the SD card.

In other words, the data merge module 14 generates file management information in such a manner that files corresponding to content data may appear on the host apparatus as if these files are stored, according to their kinds, under predetermined directories in the directory structure for classifying files according to kinds and storing the files, the directory structure being constructed on the basis of predetermined rules on the storage medium in the card-type wireless communication apparatus 1.

Next, referring to FIG. 18, a description is given of the procedure of a content information collection process which is executed by the card-type wireless communication apparatus 1. The data merge module 14 executes this content information collection process by using the UPnP control module 13.

To start with, the data merge module 14 executes an initializing process (block S1). Then, in order to discover a UPnP device, the data merge module 14 multicasts a UPnP device information acquisition command to the network by a wireless signal (block S2).

A UPnP device, which has received the UPnP device information acquisition command, sends a response to request participation in the network. The data merge module 14 receives this response as a device participation information report event (block S3, S4). The response from the UPnP device includes device description information. This device description information includes the ID (name) of the UPnP device, the IP address of the UPnP device, the class (media server, media controller, media renderer, etc.) of the UPnP device, the capability of the UPnP device, the kind of media format corresponding to the UPnP device, and the kind of the content protection system corresponding to the UPnP device.

On the basis of the device description information, the data merge module 14 updates the device list information shown in FIG. 13, and adds the discovered UPnP device to the device list information (block S5). Thereafter, the data merge module 14 requests a list of available content from the discovered UPnP device (block S6).

When the state of the UPnP device participating in the network has changed, this UPnP device reports the state change to the card-type wireless communication apparatus 1. The data merge module 14 receives this information as a state change report event (block S3, S7). The data merge module 14 requests a list of available content from the UPnP device that has reported the state change (block S6).

When the data merge module 14 has received the list of available content from the UPnP device (block S8), the data merge module 14 updates the content list information which is indicative of the list of available content with respect to each of individual UPnP devices, and adds the list of received content to the content list information (block S9). The content list, which is sent from the UPnP device, includes metadata with respect to each of individual available content data.

In block S9, the data merge module 14 also executes a process of generating directory entry information and FAT information, which correspond to the content data that is added to the content list information, and adding the generated directory entry information and FAT information to the file management information storage area of the flash memory 11. Thereby, the file management information on the file management information storage area of the flash memory 11 is dynamically updated in accordance with the change of available content data.

When the data merge module 14 has received an error report event from the UPnP device participating in the network (block S10), the data merge module 14 executes a predetermined error process for dealing with an error that has occurred (block S11).

When the available content data has changed due to, e.g. the state change of the UPnP device, the data merge module 14 sends to the host apparatus a signal which is indicative of the occurrence of a reset (card removal) event, thereby to inform the host apparatus of the updated file management information (block S12, S13). The host apparatus re-executes the card device detection process, and re-loads the file management information from the card-type wireless communication apparatus 1. Thereby, the host apparatus can execute access to the card-type wireless communication apparatus 1 in accordance with the updated file management information.

In short, the data merge module 14 has the function of sending to the host apparatus a reset signal for reporting that the removal and re-connection of the card-type wireless communication apparatus 1 have been executed, in the case where the file management information is updated.

Figure 19:
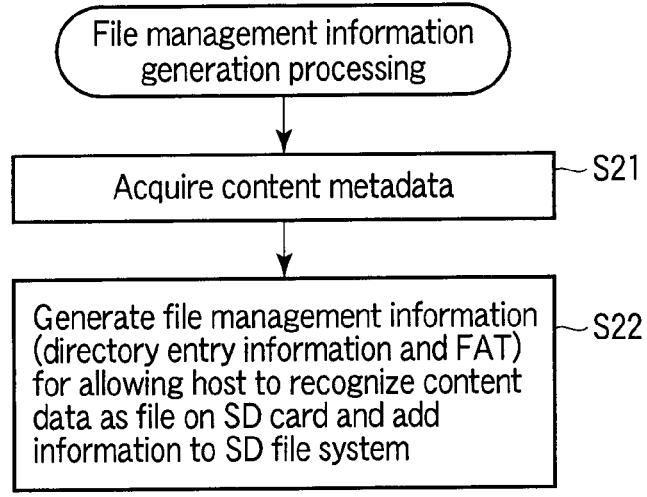
FIG. 19 is an exemplary flowchart for explaining the procedure of file management information generation processing executed by the electronic apparatus according to the embodiment.

The procedure of file management information generation processing executed by the data merge module 14 will be described next with reference to the flowchart in FIG. 19.

As described with reference to FIG. 18, the data merge module 14 requests a content list of a discovered external device and acquires metadata corresponding to content data which the discovered external device can provide (block S21). The data merge module 14 generates file management information (UPnP content directory entry information and UPnP content FAT information) for allowing the host apparatus to recognize the content data as files stored in the card-type wireless communication apparatus 1, and adds the file management information (UPnP content directory entry information and UPnP content FAT information) to the SD file system (block S22).

In block S22, for example, cluster numbers in number corresponding to the data size of content data are assigned to the content data. The directory entry information of the content data is generated based on the metadata of the content data and the starting cluster number assigned to the content data. The directory entry information is added to the Dir Table (UPnP) area a3 in FIG. 11. The FAT information representing the chain of cluster numbers assigned to the content data is added to the FAT area a5 in FIG. 11.

Figure 20:
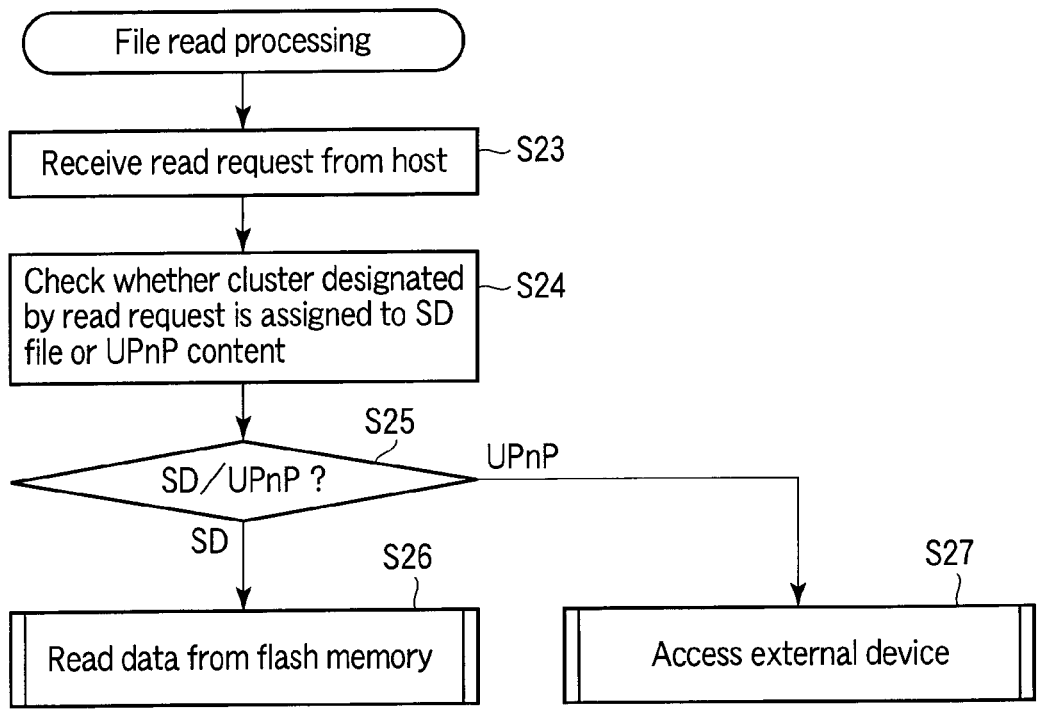
FIG. 20 is an exemplary flowchart for explaining the procedure of file read processing executed by the electronic apparatus according to the embodiment.

The procedure of file read processing executed by the data merge module 14 will be described next with reference to FIG. 20.

Upon receiving a read request from the host apparatus (block S23), the data merge module 14 determines whether the cluster (storage location) designated by the read request is a cluster assigned to a file stored in the flash memory 11 or a cluster assigned to content data providable by a UPnP media server (block S24).

If the cluster designated by the read request is a cluster assigned to a file stored in the flash memory 11 ("SD" in block S25), the data merge module 14 reads a data block corresponding to the cluster from the flash memory 11 and transfers it to the host apparatus (block S26).

On the other hand, if the cluster designated by the read request is a cluster assigned to content data providable by a UPnP media server ("UPnP" in block S25), the data merge module 14 calculates the position of a data block in the content data corresponding to the storage location designated by the read request by multiplying a value obtained by subtracting a starting storage location (starting cluster number) of the content data from the storage location (designated cluster number) designated by the read request by the size (cluster size) of the data block. That is, {(designated cluster number−starting cluster number)×data block size} is calculated as the position of a data block in the content data corresponding to the storage location designated by the read request.

Then, the data merge module 14 requests the data at the calculated position in the target content data of the UPnP media server and transfers the received data to the host apparatus (block S27).

As described above, in accordance with a read request from the host apparatus, the data merge module 14 appropriately executes not only data read from the flash memory 11 but also content data acquisition from a UPnP media server as if to read a file stored in the flash memory 11.

As described above, in the card-type wireless communication apparatus 1 according to this embodiment, file management information based on which the host apparatus recognizes content data held by an external device as if it were a predetermined file stored in a storage medium in the card-type wireless communication apparatus 1 is generated. The file management information is provided to the host apparatus. When the host apparatus sends a read request for the predetermined file to the card-type wireless communication apparatus 1 by referring to the file management information, the card-type wireless communication apparatus 1 acquires the content data from the external device and returns it to the host apparatus. It is therefore possible to add a function of handling content data in an external device to the host apparatus without any improvement of the file service program of the host apparatus.

File management information corresponding to content data contains file allocation information representing a plurality of storage locations (cluster numbers) on a storage medium corresponding to a plurality of data blocks included in the file corresponding to the content data. Hence, the card-type wireless communication apparatus 1 can output, to the host apparatus, a data block in content data corresponding to a storage location designated by a read request from the host apparatus. The host apparatus can handle content data on an external device like a normal file only by transmitting a read request to the card-type wireless communication apparatus 1 in accordance with the same procedure as in access to a normal file.

In the embodiment, the electronic apparatus is implemented as the card-type wireless communication apparatus 1 which is a card device. However, the electronic apparatus is not limited to a card device and can be any device detachably connectable to the host apparatus.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus detachably connected to a host apparatus, comprising:
    a wireless communication device configured to execute wireless communication with an external device;
    an information acquisition module configured to acquire, by wireless communication with the external device, metadata corresponding to content data which the external device can provide;
    a file management information generation module configured to generate, based on the acquired metadata, file management information based on which the host apparatus recognizes the content data as a file stored in a storage medium in the electronic apparatus; and
    a host interface module configured to, upon receiving a read request for blocks of a file corresponding to the content data, the read request being transmitted from the host apparatus based on the file management information, execute external device access processing of acquiring the content data from the external device using the wireless communication device, and output the acquired content data to the host apparatus, wherein:
    the file management information represents a plurality of storage locations on the storage medium corresponding to a plurality of data blocks included in the file corresponding to the content data;
    the host interface module outputs, to the host apparatus, a data block in the content data corresponding to a storage location designated by the read request from the host apparatus;
    the plurality of storage locations represented by the file management information are consecutive; and
    the host interface module calculates a position of the data block in the content data corresponding to the storage location designated by the read request by multiplying a value obtained by subtracting a starting storage location of the content data from the storage location designated by the read request by a size of data block.

2. The apparatus of claim 1, wherein
    the file management information generation module generates single file management information by merging other file management information for managing a file whose entity is stored in the storage medium, said other file management information being indicative of the plurality of storage locations on the storage medium where the plurality of data blocks included in the file whose entity is stored in the storage medium are stored, with the file management information corresponding to the content data, and provides the generated single file management information to the host apparatus, and
    the host interface module reads the data block of the file whose entity is stored in the storage medium from the designated storage location in a data storage area and outputs the data block to the host apparatus if the storage location designated by the read request received from the host apparatus belongs to a range of storage locations managed by said other file management information, and executes the external device access processing if the storage location designated by the read request belongs to a range of storage locations managed by the file management information corresponding to the content data.

3. The apparatus of claim 1, wherein
the file management information corresponding to the content data includes directory entry information representing a file name, attribute, and file size of the file corresponding to the content data, and
the file management information generation module generates the directory entry information based on the acquired metadata.

4. The apparatus of claim 1, which further comprises a device discovery module configured to execute device discovery processing to discover a new external device which is wirelessly connectable to the wireless communication device and provides content data, and
in which when the new external device is discovered, the information acquisition module acquires, from the new external device, metadata corresponding to the content data which the new external device can provide,
the file management information includes directory entry information and file allocation table information for each content data item, and
the file management information generation module generates, based on the acquired metadata, the directory entry information and the file allocation table information corresponding to the content data which the new external device can provide, and adds the generated directory entry information and file allocation table information to the file management information.

5. The apparatus of claim 1, wherein the electronic apparatus is implemented as a card device attachable to a card slot of the host apparatus.

6. A content data providing method for executing, by an electronic apparatus which is detachably connected to a host apparatus, a process of providing content data held by an external device to the host apparatus as a file, comprising:
executing wireless communication with the external device by a wireless communication device which is provided in the electronic apparatus, thereby acquiring metadata corresponding to content data which the external device can provide;
generating, based on the acquired metadata, file management information based on which the host apparatus recognizes the content data as a file stored in a storage medium in the electronic apparatus; and
upon receiving a read request for blocks of a file corresponding to the content data, the read request being transmitted from the host apparatus based on the file management information, executing external device access processing of acquiring the content data from the external device using the wireless communication device, and outputting the acquired content data to the host apparatus, wherein:
the file management information represents a plurality of storage locations on the storage medium corresponding to a plurality of data blocks included in the file corresponding to the content data;
a data block in the content data corresponding to a storage location designated by the read request from the host apparatus is output to the host apparatus;
the plurality of storage locations represented by the file management information are consecutive; and
said executing the external device access processing comprises calculating a position of the data block in the content data corresponding to the storage location designated by the read request by multiplying a value obtained by subtracting a starting storage location of the content data from the storage location designated by the read request by a size of data block.

7. The method of claim 6, wherein
said generating the file management information comprises generating single file management information by merging other file management information for managing a file whose entity is stored in the storage medium, said other file management information being indicative of the plurality of storage locations on the storage medium where the plurality of data blocks constituting the file whose entity is stored in the storage medium are stored, with the file management information corresponding to the content data, and providing the generated single file management information to the host apparatus, and
said executing the external device access processing comprises reading the data block of the file whose entity is stored in the storage medium from the designated storage location in a data storage area and outputting the data block to the host apparatus if the storage location designated by the read request received from the host apparatus belongs to a range of storage locations managed by said other file management information, and executing the external device access processing if the storage location designated by the read request belongs to a range of storage locations managed by the file management information corresponding to the content data.

* * * * *